June 30, 1925.  
W. W. DICKINSON, JR  
APPARATUS FOR TRANSPORTING AND SETTING BRICK AND THE LIKE  
Filed March 27, 1918  
1,543,752  
3 Sheets-Sheet 1

Inventor,
William Wallace Dickinson, Jr.,
By Hull, Smith, Brock & West
Attys.

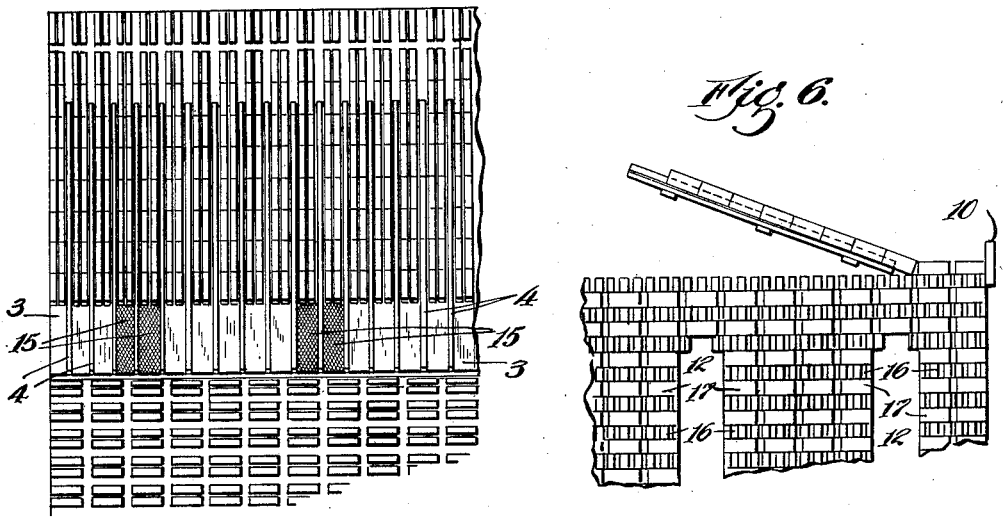
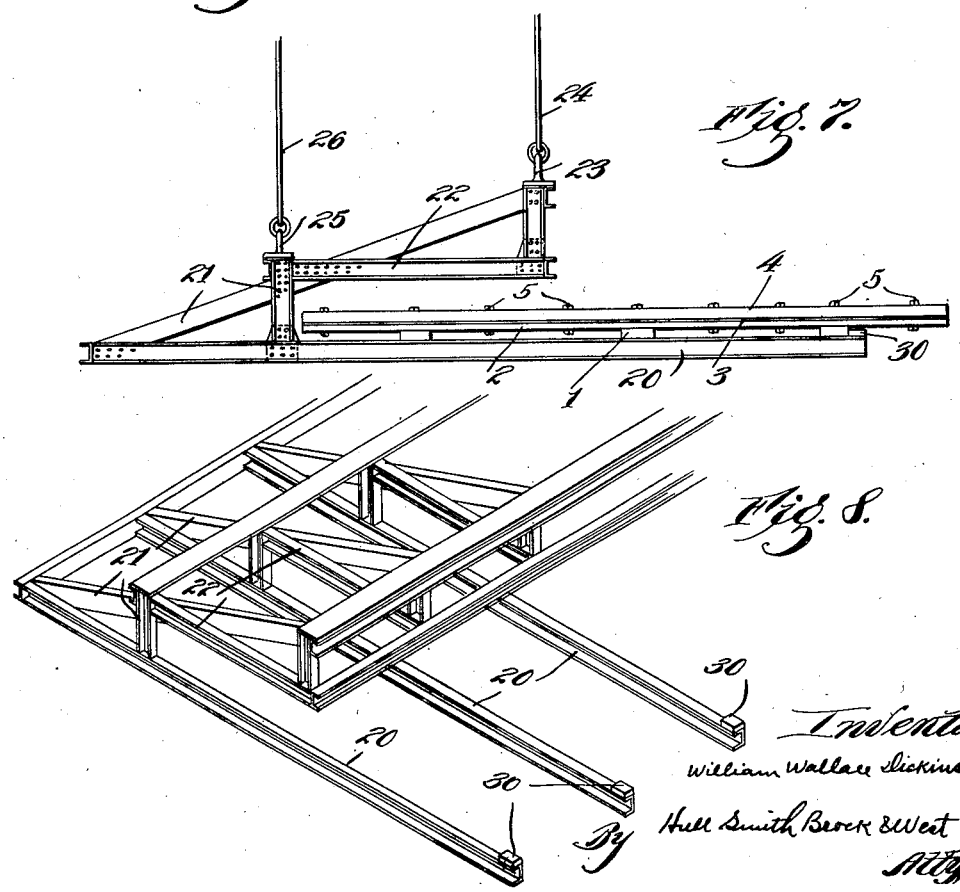

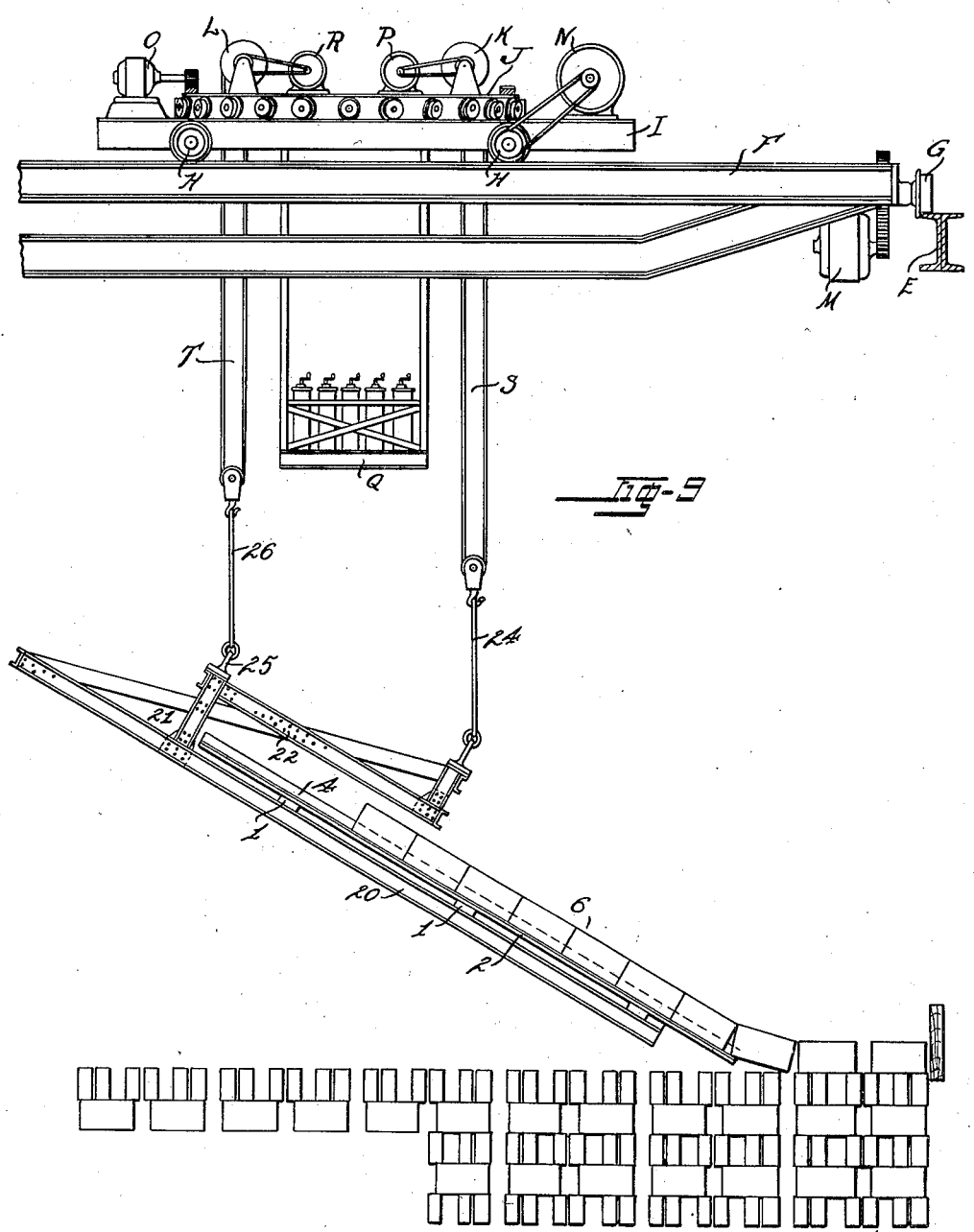

Patented June 30, 1925.

1,543,752

UNITED STATES PATENT OFFICE.

WILLIAM WALLACE DICKINSON, JR., OF LITTLE ROCK, ARKANSAS, ASSIGNOR TO THE AMERICAN EQUIPMENT COMPANY, OF CHICAGO, ILLINOIS, A CORPORATION OF OHIO.

APPARATUS FOR TRANSPORTING AND SETTING BRICK AND THE LIKE.

Application filed March 27, 1918. Serial No. 225,077.

*To all whom it may concern:*

Be it known that I, WILLIAM WALLACE DICKINSON, Jr., citizen of the United States, residing at Little Rock, in the county of Pulaski and State of Arkansas, have invented a certain new and useful Improvement in Apparatus for Transporting and Setting Brick and the like, of which the following is a full, clear, and exact description, reference being had to the accompanying drawings.

This invention relates to the handling of brick and the like regular articles and has for a general object to improve the methods and appliances for handling, conveying and setting the bricks or blocks either burned or unburned. In my copending application (Case A) filed March 20, 1918 Serial No. 223,555 I have shown certain improvements in methods and appliances for handling brick in a brick yard comprising pallets, pallet-transporting means, and means for mechanically loading said pallets with brick in orderly rows. In my copending application (Case B) filed March 25, 1918 Serial No. 224,461 now Patent No. 1,332,168 dated Feb. 24, 1920, I have shown improved appliances and methods of discharging brick either burned or unburned from such a pallet so as automatically to set them down in predetermined spaced relation, particularly designed for the purpose of building a burning or drying kiln, although equally applicable for other purposes. The present application concerns more particularly the pallet itself together with the carrier for transporting and inclining the same.

The objects of the invention are the provision of a cheap, strong and serviceable pallet adapted for the simultaneous handling of a very large quantity of brick; the provision of a supporting device or pallet adapted to receive and transport a large number of brick arranged in predetermined order in a single layer; the provision of a pallet having means to guide the brick both in their application to and their ejection from the pallet; the provision of a carrying device cooperating with said pallet; while further objects and advantages of the invention will become apparent as the description proceeds.

Figure 1:
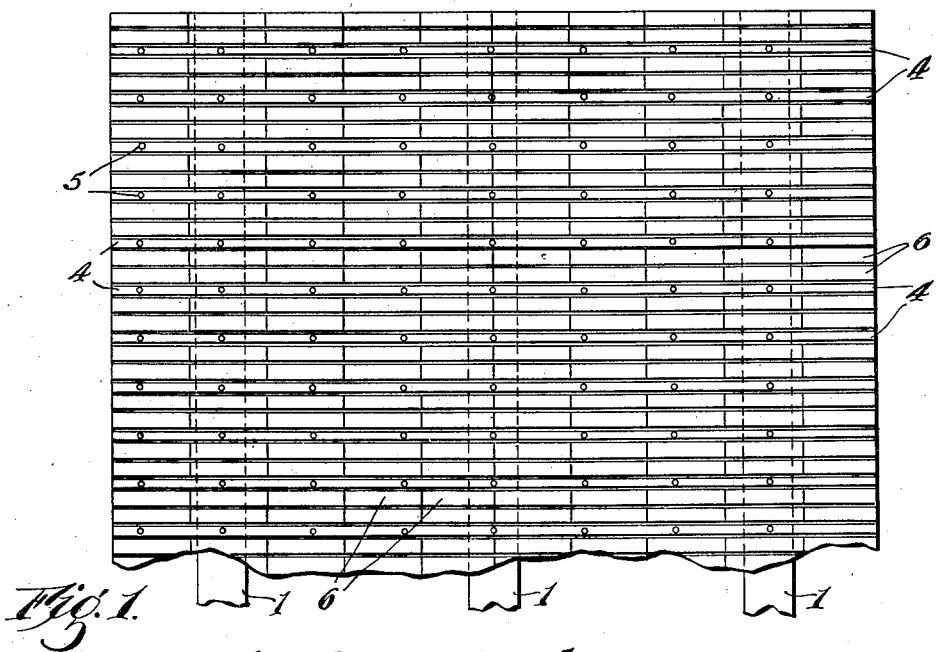
Figure 2:
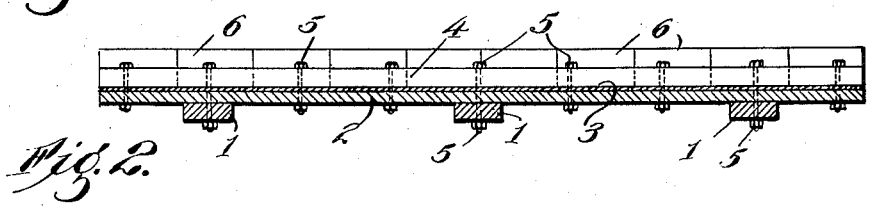
Figure 3:
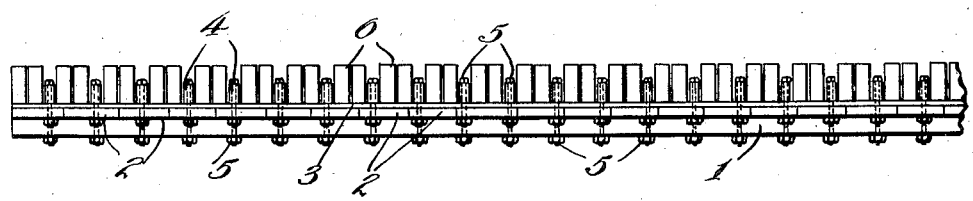
Figure 4:
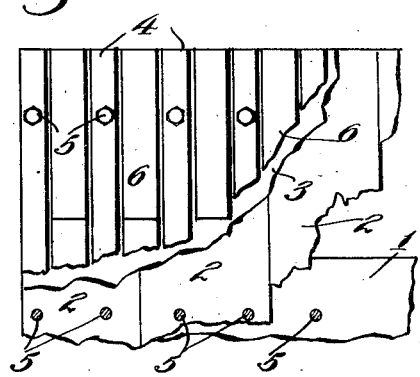

In the drawings accompanying and forming a part of this application wherein, without limiting myself, I have shown certain illustrative embodiments of my said invention; Fig. 1 represents a top plan view of part of one of my improved pallets together with the bricks thereon; Fig. 2 is a sectional view of the pallet shown in Fig. 1 together with the bricks thereon; Fig. 3 is a side elevation of the loaded pallet; Fig. 4 is a detail view showing the construction of the pallet and illustrating a modified arrangement of the bricks; Fig. 5 is a partial top plan view of a kiln with my improved pallet located thereabove and shown in the act of discharging its load of bricks; Fig. 6 represents a partial right hand elevation of the kiln and pallet shown in Fig. 5; Fig. 7 represents an end elevation of my improved pallet carrier together with an empty pallet thereon; Fig. 8 is a perspective view of the carrier shown in Fig. 7 and Fig. 9 illustrates the method of discharging the bricks from the pallet as in building a kiln.

Describing the parts by reference characters, my improved pallet preferably comprises a plurality of longitudinally stringers or joints 1, 1, not less than two in number and preferably three to each pallet. Above these are laid transverse planks 2—2, and above the planks a flat plate 3 of iron or steel, preferably about one-eighth of an inch in thickness. Above this metal plate and running from side to side of the pallet parallel to the planks 2—2 I locate a plurality of spaced guide strips 4—4, the studs, planks, plate and guide strips being securely fastened together by means of suitable bolts 5—5. The distance between adjacent strips depends upon the number of brick which it is desired to interpose therebetween. In Figs. 1, 2 and 3 I have shown the brick 6—6 applied in pairs, this being the manner in which they are frequently produced by brick machines; in Fig. 3 I have shown them as arranged singly, this being the mode of formation in some other types of machines. It will be understood, however, that my invention does not depend upon the use of any particular machinery since the bricks can equally well be applied by hand to the pallets.

The size of the pallet is entirely a matter of choice, although I prefer to make them of a rather large size, which size is commensurable with the width of the kiln in case the same are to be applied to the building of kilns. For example, I recommend the use of a pallet about thirty feet long by eight feet wide, said pallet having seventy transverse grooves each of a width to take a pair of bricks; and I recommend the building of kilns whose bodies, exclusive of the side walls or casings, are thirty feet square. Each groove of such a pallet will accommodate ten ordinary bricks end to end and the whole pallet will hold fourteen hundred bricks, the pallet and its load weighing about three tons, while such a kiln will contain, in its body portion, forty three bricks longitudinally, or one hundred forty bricks transversely.

In order to build such a kiln, the pallet, with the bricks thereon is moved to a position above the kiln and inclined relatively thereto as shown in Figs. 5 and 6 at such an angle as will cause the bricks to slide lengthwise. The pallet now being moved horizontally along the top of the kiln in a direction opposite to the direction of its inclination, the bricks will slide therefrom in a uniform manner, while the relative and angular position assumed by successive bricks at the moment of their ejection from the pallet will space them apart longitudinally the requisite uniform distance. The first brick of each layer is positioned in any suitable manner, as by means of a plank 10 held for a moment by attendants until the discharge has commenced; after four pallet loads have been applied, the kiln will require only three additional bricks in each row to complete the course, which three bricks are laid from a fifth pallet in the same manner whereupon the pallet is lifted to horizontal position so as to stop the further discharge of the brick, after which the pallet is rotated upon a vertical axis a distance of 90°, and a succeeding course is laid at right angles thereto.

For effecting these various operations, I have shown a traveling crane comprising tracks E, and a rectangular frame F supported thereon by suitable wheels G, and itself forming a transverse track for the wheels H, H, of the car I. Mounted upon the car I is the rotary turn table J carrying the hoisting drums K and L. The frame F is drawn along the rail E by the motor M; the car I is driven along the frame F by the motor N; the turntable is rotated by the motor O; the drum K is operated by the motor P; the drum L is operated by the motor R; and these various motors are governed by suitable controllers located in the operator's cage Q which depends from the car I as usual in traveling cranes. Depending from the drums K and L are the falls S and T respectively, to which in turn are attached the cables 24 and 26. It will be understood that the foregoing crane construction is illustrative merely, and that numerous other conveying expedients can be employed within the scope of my invention.

In order to form the arches or eyes 12—12 of the kiln, certain of the pallet-grooves are left empty, these grooves being identified in any suitable manner as by painting those grooves or their separated strips some distinctive color as shown at 15 in Fig. 5. Pallets loaded in this intermittent manner I employ for setting the courses 16 between the eyes or arches wherein the bricks are laid with their longer dimension parallel to the arches, while the intermediate courses 17—17 are laid from completely filled pallets, the discharge being stopped at the edge of each arch by raising the pallet past the discharge angle, and recommenced upon the opposite side of the arch in the same manner as at the side of the kiln, (see Fig. 10).

Additional brick for the laying of the enclosing or casing walls are also deposited around the kiln by means of the same pallets, rows of any desired width and height being set down thereby, after which the placing of the bricks is generally by hand.

For handling, transporting, and inclining the pallets I preferably employ a carrier of the type shown in Figs. 7 and 8 comprising a plurality of stiff arms 20—20, free at one end and rigidly secured at their opposite ends to a rigid frame 21 which overhangs the fingers as shown at 22 and is provided with anchorages 23 for the reception of the suspending cable 24, and also with other anchorages 25 for the reception of the tilting cable 26. The suspending cable is so located relatively to the carrier and to the pallet which is to be carried thereby, as always to be forward of the center of gravity of the carrier and its load, even though that load be concentrated entirely at the discharge side of the pallet. The anchorage 25 is located upon the opposite side of the center of gravity so that upon the elevation of the cable 26, the pallet can be inclined to any desired degree.

The forward end of each arm is provided with a projection 30 adapted to engage a suitable abutment on the under side of the pallet, such as the edge of one of the longitudinal stringers 1, thus preventing the displacement of the pallet, while the stiffness of the pallet, reinforced by the stiffness of the carrier, prevents any such warping of the pallet as would bring it into accidental engagement with the previously deposited course as to injure that course accidentally.

It is not essential to my invention that the pallet be co-extensive with the kiln, although it is preferably commensurable therewith; and it is desirable that it extend from side to side thereof since in many cases it is convenient to have a workman steady each side thereof during the discharging operation without obliged to walk upon the bricks already laid. The particular method of loading the pallet is not important, as it is entirely feasible to have the bricks placed thereon by hand since this enables the employment of unskilled labor and dispenses with the need of so many expert kiln builders as previous practice has required. Neither is my pallet restricted to use in building kilns, since it is entirely feasible to construct walls, piers, and the like therewith, burned bricks or stone blocks, being set thereby in predetermined spaced relation and afterwards covered with a cement mixture which fills the space between the adjacent units and forms a bed for the succeeding course. I do esteem it essential though that the bricks or blocks be laid on the pallet only in a single layer, since otherwise the interaction of the adjacent layers will prevent the proper spacing of the bricks as they are deposited.

It will be understood that I do not limit myself to the force of gravity as the sole means for discharging the bricks from the carrier, but may employ a pushing means to assist the same within the scope of my invention and also that many other changes in matters of detail may be made.

Having thus described my invention, what I claim is:—

1. A pallet for transporting and setting uniform rectangular blocks comprising a rigid rectangular platform having spaced grooves upon its upper surface adapted for the reception of said blocks in longitudinally abutting relation.

2. A pallet for transporting and setting uniform rectangular blocks comprising a rigid rectangular platform having spaced parallel strips traversing the upper surface thereof adapted to receive parallel rows of said blocks between them in longitudinally abutting relation.

3. A pallet for transporting and setting uniform rectangular blocks comprising a rigid rectangular platform having a wearproof upper surface, and spaced parallel strips traversing said upper surface and adapted to receive rows of said articles therebetween in longitudinally abutting relation.

4. A pallet for transporting and setting uniform rectangular blocks comprising a rigid rectangular platform having a metallic upper surface upon which the blocks may slide, and spaced parallel strips traversing said upper surface and adapted to receive rows of said articles therebetween in longitudinally abutting relation, in combination with means for presenting said pallet to a receiving surface in oblique angular relation.

5. A pallet for transporting and setting regular rectangular articles, such as brick, consisting of a plurality of longitudinal stringers, transverse plank overlying said stringers, a metallic plate covering said plank, and a plurality of spaced strips traversing the upper surface of said plate, said strips, plate, plank and stringers being rigidly bolted totgether.

6. A pallet for setting brick upon a kiln comprising a platform having its length commensurable with the width of the kiln body and having spaced grooves traversing its upper face from side to side, said grooves adapted to receive rows of brick in longitudinally abutting relation, and adjacent grooves being spaced apart by an amount equal to the desired lateral spacing of the bricks in the kiln-body.

7. A pallet for transporting and setting unburned brick upon a kiln, comprising a rectangular platform whose length is commensurable with the width of the kiln body and having a smooth upper surface upon which the bricks may slide, and a plurality of spaced strips traversing the upper surface of said pallet transversely of its length and adapted to receive rows of bricks between them, the width of said strips being equal to the desired lateral spacing of the bricks in the kiln-body.

8. A pallet for transporting and setting unburned brick upon a kiln, comprising a rectangular platform whose length is equal to the width of the kiln-body and having a smooth upper surface upon which the bricks may slide, and a plurality of guide strips traversing the upper surface of said pallet transversely of its length, said strips defining grooves of a width to receive pairs of brick set on edge and the width of said strips being equal to the lateral distance desired between alternate pairs of bricks in the kiln-body.

9. In brick handling apparatus a pallet consisting of a rigid rectangular platform having spaced longitudinal members on its lower surface and spaced transverse strips on its upper surface, the latter strips being separated a sufficient distance to receive rows of bricks.

10. In brick handling apparatus, a device for carrying brick to and depositing the same in predetermined regular relation upon a receiving surface, said device comprising a rectangular structure having a plurality of laterally spaced channels for the reception of rows of longitudinally abutting bricks, each channel having a fixed bottom-portion upon which the bricks may rest and be supported, and spaced side portions between which the bricks are received loosely, the width of said device being commensurable with the width of the receiving surface and the distance between channels being such that the width of three rows of bricks shall be substantially equal to the length of a single brick, in combination with means for causing the ejection of such rows longitudinally from said channels upon a layer of bricks which extend transversely of said channels.

11. In brick handling apparatus, a carrier for conveying brick to and depositing the same in predetermined regular relation upon a receiving surface, said carrier having a plurality of spaced parallel channels adapted for the reception of a single layer of bricks arranged endwise in rows, each channel having a fixed bottom portion which underlies the bricks and a pair of spaced side walls which are rigid relatively to the bottom portion of that channel, in combination with means for causing the ejection of such rows longitudinally from said channels upon a receiving surface which lies entirely beneath the lowest point of said carrier, the distance between channels being such that the width of three rows of brick shall be substantially equal to the length of a single brick.

In testimony whereof, I hereunto affix my signature.

WILLIAM WALLACE DICKINSON, Jr.